No. 662,891. Patented Nov. 27, 1900.
J. S. COPELAND.
CHAINLESS VELOCIPEDE.
(Application filed Apr. 23, 1898.)

(No Model.) 2 Sheets—Sheet 1.

Witnesses:
William H. Barker.
Arthur B. Jenkins.

Inventor:
James S. Copeland
By Chas. L. Burden,
Attorney.

No. 662,891. Patented Nov. 27, 1900.
J. S. COPELAND.
CHAINLESS VELOCIPEDE.
(Application filed Apr. 23, 1898.)
(No Model.) 2 Sheets—Sheet 2.
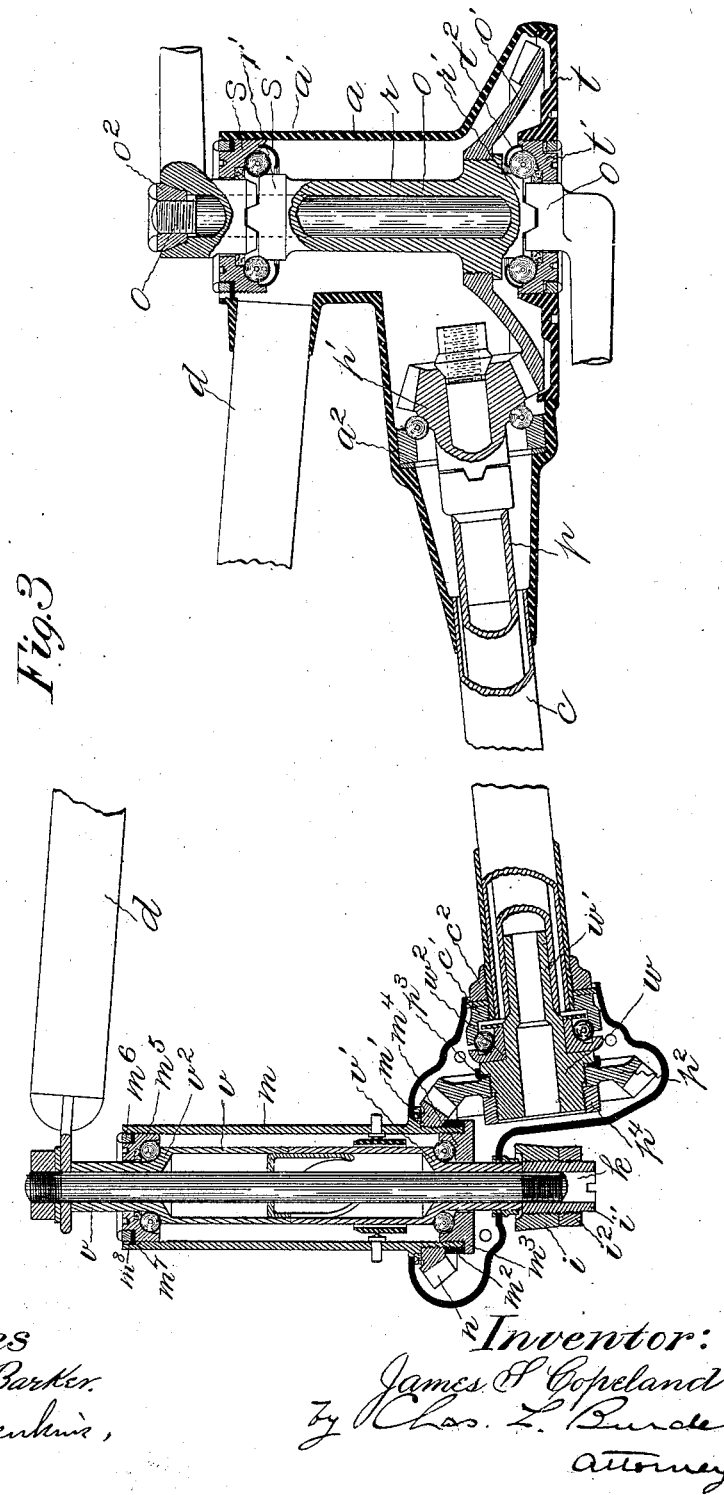
Witnesses
William H. Barker.
Arthur B. Jenkins,
Inventor:
James S. Copeland
by Chas. L. Burdett,
Attorney

UNITED STATES PATENT OFFICE.

JAMES S. COPELAND, OF HARTFORD, CONNECTICUT.

CHAINLESS VELOCIPEDE.

SPECIFICATION forming part of Letters Patent No. 662,891, dated November 27, 1900.

Application filed April 23, 1898. Serial No. 678,555. (No model.)

*To all whom it may concern:*

Be it known that I, JAMES S. COPELAND, a citizen of the United States, and a resident of Hartford, in the county of Hartford and State of Connecticut, have invented certain new and useful Improvements in Chainless Velocipedes, of which the following is a full, clear, and exact description, whereby any one skilled in the art can make and use the same.

My invention relates to the driving mechanism for vehicles in which there is a frame, wheels, and means which connect a driving-shaft with a wheel hub or axle, the features of improvement being particularly applicable to velocipedes, bicycles, and vehicles of that class.

A main object of my invention is to provide a geared mechanism in which the driving means and gear-wheels may be united to or separated from the frame without disturbing the adjustment of the bearings or the main portions of the frame, which are united and made rigid as to the several members when the frame is once assembled.

To this end my invention consists in the combination of a rigid frame united as to its parts, the gear driving mechanism, with means for connecting the several shafts and gears and the adjustable bearings, and in details of the parts and their combination, as hereinafter described, and more particularly pointed out in the claim.

Figure 1:
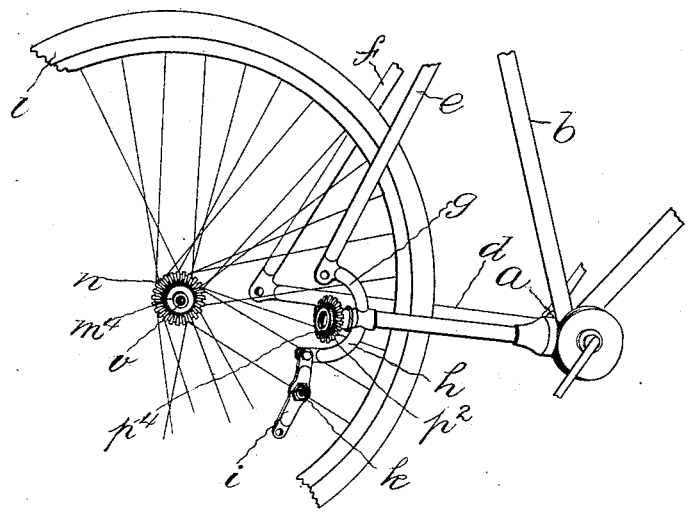
Figure 2:
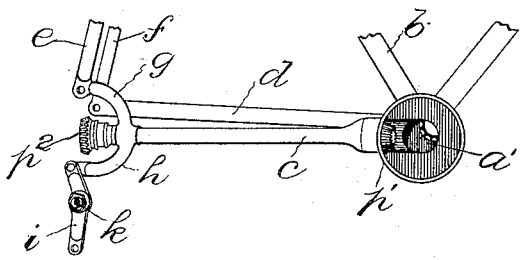

Referring to the drawings, Figure 1 is a view in side elevation of a bicycle in connection with which my improvement is illustrated in the present case. Fig. 2 is a detail perspective view of the lower rear fork and crank-bracket of a bicycle-frame with the connecting-shaft in place. Fig. 3 is a detail view in section through the lower rear fork and connected parts on line with the axis of the connecting-shaft.

In the accompanying drawings the letter $a$ denotes the crank-bracket of a bicycle-frame; $b$, the frame-upright; $c\ d$, the lower rear-fork tubes; $e$ and $f$, the upper rear-fork tubes, and $g$ and $h$ the right fork connecting tubes or braces, the upper brace $g$ being brazed or otherwise firmly and rigidly secured to the upper rear fork $e$ and the lower rear fork $c$. A swinging latch $i$ is attached at one end, as by means of a bolt, to the outer end of the lower connecting-tube $h$ and at its upper end to a lug on the lower end of the upper rear-fork tube $e$. A socket $k$ is located about midway of this latch $i$, and into this socket the threaded end of a pin or axle extends. The driving-wheel $l$ is located between the forked members of the frame and is held in position on the axle, which extends through the hub $m$ and through the openings in the lug at the junction of the rear forks on the one side and the socket in the latch $i$ at the other side of the frame. The hub $m$ of this driving-wheel is in the form of driving mechanism shown provided with a bevel-gear $n$, which is arranged to mesh with a bevel-gear on the rear end of the connecting-shaft of the driving-gear mechanism. The crank-bracket is hollow and the crank $o$ extends through it, the bearings for the crank-shaft being located at the opposite ends of the socket $a'$ in the bracket. The main or crank shaft gear $o'$ is located in the crank-bracket $a$ and facing inward meshes with the gear-wheel $p'$, which is removably secured to the front end of the connecting-shaft $p$. This connecting-shaft $p$ is located within and extends through the lower rear-fork tube $c$, carrying fast to its rear end a bevel-gear $p^2$, arranged to engage the gear $n$ on the hub of the driving-wheel $l$.

The driving mechanism comprises the crank-shaft operated by means of the cranks and pedals connected thereto, the inward-facing gear-wheel fast to the crank-shaft, the connecting-shaft located in the lower rear-fork tube $c$, the gear-wheels on the front and rear ends of the connecting-shaft, and the gear-wheel on the hub of the driving-wheel. These parts are so connected with the frame of the vehicle in my improvement as to enable them to be easily assembled and afterward readily removed without disturbing the main frame members or the adjustment of the parts of the driving means.

Within the crank-bracket $a$ the crank-shaft $o$ supports a sleeve $r$ shorter than the bracket and having cones $r'$ at its opposite ends, forming part of the ball-races for the ball-bearings. This sleeve is held against rotation on the crank-shaft by projections on opposite sides of the one part, as the sleeve, fitting into sockets in the opposing face of a shoulder on the opposite part, as the inner ends of the crank-hubs. At one end of the crank-bracket $o$ an annular ball-case $s$ is removably secured, preferably by means of interengaging threads on the respective parts, and the balls of the bearing are held in the race temporarily by a retainer-ring $s'$, secured to the case and surrounding and overarching the balls, but leaving a clear space for the surface contact of the balls with the cone which is on the sleeve. A circular disk or cover-plate $t$, removably secured in the opposite end of the crank-bracket $a$, supports an adjustable ball-case $t'$ with balls held therein by a retainer-ring $t^2$ identical with the ring $s'$ in form and function, and these balls when the shaft $o$ and sleeve $r$ are in position in the bracket are in running contact with the cone on the adjacent end of the sleeve. Both of these ball-cases $s$ and $t'$ are adjustable lengthwise of the crank-bracket, and this enables the position of the main gear, which is fast to the sleeve, to be adjusted with reference to and across the line of the axis of the connecting-shaft $p$. This adjustment is determined when the crank-shaft is assembled in place in the bracket at the factory, and after being once adjusted the crank-shaft may be removed from the bracket by unscrewing the nut $o^2$ on the end of the crank-shaft $o$. The crank-shaft can then be pulled out of the hub of the crank-arm and out of the sleeve, or by removing the plate $t$ the crank-shaft and the sleeve, with its appurtenant main gear-wheel, may all be removed from the bracket. This is a very simple operation, requires but few tools, and is done without disturbing the adjustment of the ball-bearings. The parts can then be replaced by reversing these steps and secured in place in the crank-shaft without requiring the services of a skilled operative.

Another feature of my invention resides in the details of construction of the parts of the gear driving mechanism appurtenant to the driving-wheel $l$. The hub $m$ of this wheel is of the barrel type, and the gear-wheel $n$ is screwed upon the threaded end of the hub, with the back of the gear resting against a shoulder $m'$ on the hub and held firmly in place by the collar $m^2$, which is located between the outer edge of the hub of the gear and the overhanging flange $m^3$ of the case $m^4$. This case $m^4$ of the ball-bearings at this end of the hub is threaded to fit the thread on the inner surface of the hub, and its position with reference to the distance it enters the hub is determined by the width of the collar $m^2$. At the opposite end of the hub $m$ an adjustable ball-case $m^5$ is held by engaging threads on the respective parts, and it is clamped by an annular lock-nut or collar $m^6$, threaded on its edge and used as a follower. A thin metallic washer $m^7$ is located between the case $m^5$ and the nut $m^6$ and is held against rotation by a lug on its edge, which enters a narrow socket $m^8$ in the inner face of the hub. This construction prevents accidental loosening of the case.

The rear-wheel axle extends through the rear-fork connection on one side of the frame through the sleeve $v$, which is within the hub $m$, and on the side where the gears are located fits into the short sleeve $i'$, which has an internal thread to fit that on the axle and an external thread which engages the thread in the socket in the latch $i$. A lock-nut $i^2$ fits upon the sleeve $i'$ on the outer side of the latch. This sleeve $v$ is provided with the cones which coöperate with the cases $m^4\ m^5$ to support the balls for the bearings, and it rests at one end against the inner surface of the rear-fork connection and at the other end against the inner end of the sleeve $i'$ in the latch.

In the open end of the connecting-shaft $p$ a hub $w$ is fastened by brazing its shank $w'$ to this tubular shaft, and a shoulder on the hub backs up the cone $w^2$, the corresponding case $c'$ for the ball-bearings being adjustably secured on the threaded rear end of the frame member $c$ and held against movement thereon by a lock-nut $c^2$.

On the reduced and threaded front part of the hub $w$ the gear-wheel $p^2$ is secured, a metallic washer $p^3$, clamped between the back of the gear-wheel and the shoulder on the hub, being used in adjusting the gear. Washers of variable thickness may be used for this purpose. A lock-nut $p^4$ clamps the gear-wheel in place in the usual manner.

For the purpose of protecting the gears from dirt and dust and in part to hold lubricating material they are inclosed by a sectional cover, which is fitted closely about the parts and held together by bolts or screws. In the within-illustrated form of driving means bevel-gears are employed for transmitting the power from the crank-shaft to the driving-wheel through the intermediate shaft and gears.

The ball-case $a^2$, which is secured within the socket in the crank-bracket $a$, and the ball-case $c'$, which is firmly held on the rear end of the side fork $c$, are supported by rigid parts of the frame, and therefore not disturbed by the removal of a cone-bearing part—such, for instance, as the gear-wheel $p'$. Any thrust lengthwise or lateral upon the connecting-shaft is thus resisted by a rigid frame member. This enables adjustment of moving parts to be made and maintained and running parts to be removed and then replaced without disturbing the frame parts or the adjustment of the bearings. On the sleeve $v$, which is inside the driving-wheel hub, the cones $v'\ v^2$ are arranged in the same relation to the respective ball-cases as to the bearing-surfaces as are the cones and cases of the connecting-shaft bearings—that is, the lines which may be drawn through the points of contact of the balls and their bearing-surfaces are substantially coincident with the lines of thrust upon the balls. This feature of construction exists in all the bearings in the vehicle and prevents the accidental breaking of the balls and cases, which has been a serious fault in gear-driven bicycles of prior construction.

I claim as my invention—

In a velocipede or like vehicle, in combination with a frame, wheels and driving mechanism, a driving-wheel axle threaded at both ends, mounted at one end in a frame member and at the other in a removable latch, a sleeve surrounding the axle and supporting bearing-cones, a wheel-hub surrounding the sleeve and containing bearing-cases, a sleeve screwed into the latch and onto the axle and abutting against the first sleeve and then secured by a lock-nut, the first sleeve abutting at the other end against the frame member and secured by a lock-nut on the axle on the outer side of the frame member.

JAMES S. COPELAND.

Witnesses:
HARNO E. HART,
HERMANN F. CUNTZ.